United States Patent
Jie (10) Patent No.: US 11,348,249 B2
(45) Date of Patent: May 31, 2022

(54) TRAINING METHOD FOR IMAGE SEMANTIC SEGMENTATION MODEL AND SERVER

(71) Applicant: Tencent Technology (Shenzhen) Company Limited, Shenzhen (CN)

(72) Inventor: Zequn Jie, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 147 days.

(21) Appl. No.: 16/929,444

(22) Filed: Jul. 15, 2020

(65) Prior Publication Data

US 2021/0035304 A1    Feb. 4, 2021

Related U.S. Application Data

(63) Continuation of application No. PCT/CN2019/079404, filed on Mar. 25, 2019.

(30) Foreign Application Priority Data

Apr. 10, 2018  (CN) .......................... 201810317672.3

(51) Int. Cl.
  *G06T 7/00* (2017.01)
  *G06T 7/11* (2017.01)
  (Continued)

(52) U.S. Cl.
  CPC ............... *G06T 7/11* (2017.01); *G06K 9/627* (2013.01); *G06K 9/6232* (2013.01);
  (Continued)

(58) Field of Classification Search
  CPC ............. G06T 7/11; G06T 2207/20081; G06T 2207/20084; G06K 9/6232; G06K 9/6263;
  (Continued)

(56) References Cited

U.S. PATENT DOCUMENTS 10,477,148 B2 * 11/2019 Bright-Thomas ...... G06V 10/82
2018/0260651 A1 * 9/2018 Wang .................... G06V 10/454

FOREIGN PATENT DOCUMENTS

CN    107145845 A    9/2017
CN    107316015 A    11/2017

OTHER PUBLICATIONS

Jiwoon et al. ("Learning Pixel-level Semantic Affinity with Image Level Supervision for Weakly Supervised Semantic Segmentation", arxiv.org, Cornell University Library, 201 Olin Library Cornell University Ithaca, NY 14853, Mar. 28, 2018, XP081225854) (Year: 2018).*

(Continued)

*Primary Examiner* — Ping Y Hsieh
(74) *Attorney, Agent, or Firm* — Morgan, Lewis & Bockius LLP (57) ABSTRACT

Embodiments of this application disclose a method for training an image semantic segmentation model performed at a server, to locate all object regions in a raw image, thereby improving the segmentation quality of image semantic segmentation. The method includes: obtaining a raw image used for model training; performing a full-image classification annotation on the raw image at different dilation magnifications by applying a multi-magnification dilated convolutional neural network model to the raw image, and obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion; and training an image semantic segmentation network model using the global object location maps as supervision information.

17 Claims, 6 Drawing Sheets

(51) Int. Cl.
  *G06K 9/62* (2022.01)
  *G06N 3/04* (2006.01)
  *G06N 3/08* (2006.01)

(52) U.S. Cl.
  CPC ............. *G06K 9/6263* (2013.01); *G06N 3/04* (2013.01); *G06N 3/08* (2013.01); *G06T 2207/20081* (2013.01); *G06T 2207/20084* (2013.01)

(58) Field of Classification Search
  CPC .... G06K 9/627; G06K 9/6256; G06K 9/6271; G06K 9/6268; G06N 3/04; G06N 3/08; G06N 3/084; G06N 3/0454; G06V 10/25; G06V 10/454; G06V 10/82
  See application file for complete search history.

(56) References Cited

OTHER PUBLICATIONS

Liang et al. ("Rethinking Atrous Convolution for Semantic Image Segmentation", Jun. 17, 2017, XP055558070, Retrieved from the Internet: URL: https://arxiv.org/pdf/1706.05587v1.pdf) (Year: 2017).*
Bolei Zhou et al., "Learning Deep Features for Discriminative Localization", Computer Science and Artificial Intelligence Laboratory, MIT, Dec. 14, 2015, XP055775238, 10 pgs., Retrieved from the Internet: https://arxiv.org/pdf/1512.04150.pdf.
Extended European Search Report, EP19874497.0, dated Dec. 9, 2021, 11 pgs.
Jiwoon Ahn et al., "Learning Pixel-Level Semantic Affinity with Image-level Supervision for Weakly Supervised Semantic Segmentation", Arxiv.org, Cornell University Library, Ithaca, NY 14853, Mar. 28, 2018, XP081225854, 14 pgs.
Liang-Chieh Chen et al., "DeepLab: Semantic Image Segmentation with Deep Convolutional Nets, Atrous Convolution, and Fully Connected CRFs", Arxiv.org, Cornell University Library, Ithaca, NY 14853, Jun. 2, 2016, XP080705599, 14 pgs.
Liang-Chieh Chen et al., "Rethinking Atrous Convolution for Semantic Image Segmentation", Jun. 17, 2017, XP055558070, 10 pgs., Retrieved from the Internet: https://arxiv.org/pdf/1706.05587v1.pdf.
Yunchao Wei et al., "Revisiting Dilated Convolution: A Simple Approach for Weakly- and Semi-Supervised Semantic Segmentation", 2018 IEEE/CVF Conference on Computer Vision and Pattern Recognition, Jun. 18, 2018, XP33473646, 10 pgs.
Tencent Technology, ISR, PCT/CN2019/079404, May 30, 2019, 2 pgs.
Tencent Technology, WO, PCT/CN2019/079404, May 30, 2019, 4 pgs.
Tencent Technology, IPRP, PCT/CN2019/079404, Oct. 13, 2020, 5 pgs.

* cited by examiner

Raw image     Weakly supervised semantic segmentation     Annotated true value

TRAINING METHOD FOR IMAGE SEMANTIC SEGMENTATION MODEL AND SERVER

CROSS REFERENCE TO RELATED APPLICATIONS

This application is a continuation application of PCT Patent Application No. PCT/CN2019/079404, entitled "TRAINING METHOD FOR IMAGE SEMANTIC SEGMENTATION MODEL AND SERVER" filed on Mar. 25, 2019, which claims priority to Chinese Patent Application No. 201810317672.3, entitled "TRAINING METHOD FOR IMAGE SEMANTIC SEGMENTATION MODEL AND SERVER" filed Apr. 10, 2018, all of which are incorporated by reference in their entirety.

FIELD OF THE TECHNOLOGY

This application relates to the field of computer technologies, and in particular, to training for an image semantic segmentation model.

BACKGROUND OF THE DISCLOSURE

An image semantic segmentation is the basis of image understanding, and the image semantic segmentation is very important in automatic drive, UAV applications, and wearable device applications. An image is formed by many pixels, and the semantic segmentation is grouping the pixels according to different semantic meanings expressed in the image.

In the related art, usually, a conventional deep convolutional neural network is trained as an image semantic segmentation network. First, full-image classification is performed on an input image, object regions corresponding to a full-image classification annotation in the image are located according to the network, and then the regions are used as supervision information for an image semantic segmentation, and the image semantic segmentation network is trained by using the supervision information.

In the related art, by locating the object regions corresponding to the full-image classification annotation by using a conventional convolution operation, usually, only one or more most discriminative parts of an entire object can be located, and it is difficult to locate all object regions. Therefore, the image semantic segmentation in the related art has a problem that not all object regions can be located.

SUMMARY

Embodiments of this application provide a training method for an image semantic segmentation model and a server, to locate all object regions from a raw image, thereby improving the segmentation quality of an image semantic segmentation.

To resolve the foregoing technical problem, the embodiments of this application provide the following technical solutions:

According to one aspect, an embodiment of this application provides a training method for an image semantic segmentation model, applied to a server, the method including:

obtaining a raw image used for model training;

performing a full-image classification annotation on the raw image at different dilation magnifications by applying a multi-magnification dilated convolutional neural network model to the raw image, and obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion; and training an image semantic segmentation network model using the global object location maps as supervision information.

According to one aspect, an embodiment of this application provides a server, the server including: a processor, memory and a plurality of programs stored in the memory, wherein the plurality of programs, when executed by the processor, cause the server to perform the method according to any one of the first aspect.

According one aspect, an embodiment of this application provides a non-transitory computer readable storage medium, the computer readable storage medium storing instructions, the instructions, when executed by a processor of a server, cause the server to perform the method of the foregoing aspects.

It can be seen from the foregoing technical solutions that, the embodiments of this application have the following advantages:

In the embodiments of this application, first, a raw image used for model training is obtained, then, a full-image classification annotation is performed on the raw image at different dilation magnifications by using a multi-magnification dilated convolutional neural network model, to obtain global object location maps in the raw image at different degrees of dispersion, any degree of dispersion being used for indicating a distribution, on a target object, of object regions located at a dilation magnification corresponding to the degree of dispersion by the multi-magnification dilated convolutional neural network model; and finally, the global object location maps are used as supervision information for an image semantic segmentation network model, and the image semantic segmentation network model is trained by using the supervision information. In the embodiments of this application, because the full-image classification annotation is performed on the raw image by using the multi-magnification dilated convolutional neural network model, global object location maps at different degrees of dispersion can be located from the raw image through a multi-magnification dilated convolution of the multi-magnification dilated convolutional neural network model. The global object location maps include all regions of the target object. Therefore, in the embodiments of this application, all object regions corresponding to the full-image classification annotation in the raw image are precisely located by the multi-magnification dilated convolutional neural network model, thereby improving the segmentation quality of an image semantic segmentation.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show merely some embodiments of this application, and persons skilled in the art may still derive other drawings from these accompanying drawings.

FIG. 6-*a* is a schematic diagram of a composition structure of a server according to an embodiment of this application.

FIG. 6-*b* is a schematic diagram of a composition structure of a global object location module according to an embodiment of this application.

FIG. 6-*c* is a schematic diagram of a composition structure of a pooling processing unit according to an embodiment of this application.

FIG. 6-*d* is a schematic diagram of a composition structure of a dilated convolution unit according to an embodiment of this application.

FIG. 6-*e* is a schematic diagram of a composition structure of a model training module according to an embodiment of this application.

DESCRIPTION OF EMBODIMENTS

The embodiments of this application provide a training method for an image semantic segmentation model and a server, to locate all object regions from a raw image, thereby improving the segmentation quality of the image semantic segmentation. The method may applied to a server; and the server may be a service device that has a data processing capability and that is located at a network side. When the terminal device has a sufficient data processing capability, the method may also be applied to a terminal device, and the terminal device may be a computing device such as a personal computer (PC) or a smart terminal that has a data processing capability and that is located at a user side.

To make the invention objectives, features, and advantages of this application clearer and more comprehensible, the following clearly and completely describes the technical solutions in the embodiments of this application with reference to the accompanying drawings in the embodiments of this application. Apparently, the embodiments described below are merely a part rather than all of the embodiments of this application. All other embodiments obtained by persons skilled in the art based on the embodiments of this application shall fall within the protection scope of this application.

In the specification, claims, and the foregoing drawings of this application, the terms "include", "contain" and any other variants mean to cover the non-exclusive inclusion, so that a process, method, system, product, or device that includes a series of units is not necessarily limited to those units, but may include other units not expressly listed or inherent to such a process, method, product, or device.

Detailed descriptions are separately provided below.

An embodiment of the training method for an image semantic segmentation model provided in the embodiments of this application may be specifically applied to a full-image classification annotation on an image based on a dilated convolutional neural network model. The training method for an image semantic segmentation model provided in the embodiments of this application uses a weakly supervised image semantic segmentation technology, may be applied to a situation lack of data segmented and annotated at a fine pixel level, and depends on the full-image classification annotation only, to implement a highly accurate image segmentation. In the embodiments of this application, global object location maps corresponding to the full-image classification annotation in the image are obtained based on the full-image classification annotation mainly by using a dilated convolutional neural network model. Specifically, first, a multi-magnification dilated convolutional neural network model is trained to implement full-image classification, and after the network model is obtained, the global object location maps corresponding to the full-image classification annotation in the raw image are precisely located through a multi-magnification dilated convolution. Then, the located global object location maps are used as supervision information for segmentation, to train the image semantic segmentation network model to implement an image segmentation. In the training method for an image semantic segmentation model provided in the embodiments of this application, images with annotations created by users may be automatically crawled on a website with massive user data, to train a weakly supervised image semantic segmentation network to implement the image semantic segmentation. A semantic segmentation result may be used in search by image based on image content on a website, personalized recommendations based on image content analysis, and the like.

Figure 1:
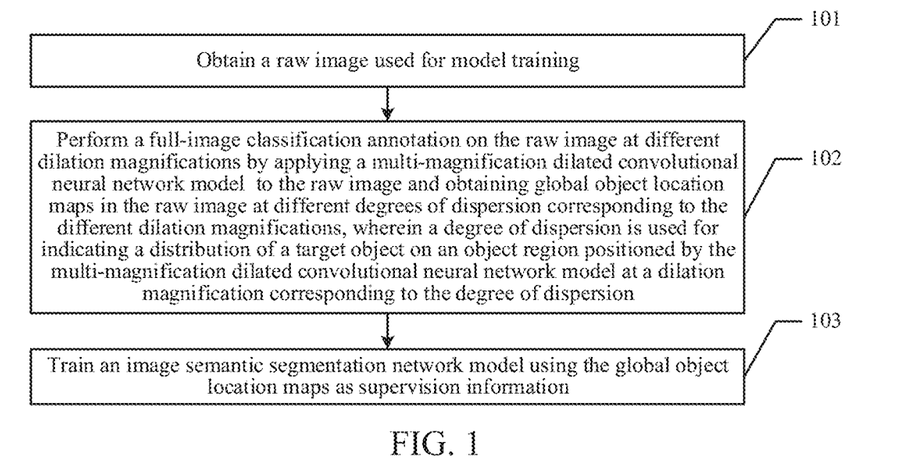
FIG. 1 is a schematic block flowchart of a training method for an image semantic segmentation model according to an embodiment of this application.

Referring to FIG. 1, the training method for an image semantic segmentation model provided in an embodiment of this application may include the following steps:

101. Obtain a raw image used for model training.

In this embodiment of this application, a training sample image library may store training sample images, and these images may be used for model training. That is, these images may be referred to as raw images used for model training, and are briefly referred to as raw images in subsequent embodiments. A raw image includes one or more target objects, and the target object may be an object in a variety of shapes, for example, a tool, an animal, or a person, which is not limited herein. In this embodiment of this application, the raw image may be stored in a plurality of manners. For example, the server receives a raw image from a client and stores the raw image to a database of the server, or the server reads a raw image in an internal memory in real time, to improve model training efficiency.

102. Perform a full-image classification annotation on the raw image at different dilation magnifications by applying a multi-magnification dilated convolutional neural network model to the raw image, and obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion.

In this embodiment of this application, full-image classification is performed by using a convolutional neural network model, and the convolutional neural network model used in this embodiment of this application uses dilated convolutions of a plurality of dilation magnifications. Therefore, the convolutional neural network model used in this embodiment of this application may also be referred to as a multi-magnification dilated convolutional neural network model. Specifically, in this embodiment of this application, first, the multi-magnification dilated convolutional neural network model may be trained to implement full-image classification, and after the network model is obtained, global object location maps corresponding to the full-image classification annotation in the image are precisely located through a multi-magnification dilated convolution. The multi-magnification dilated convolutional neural network model used in this embodiment of this application may achieve the full-image classification objective, and overcome the defects in the related art that the convolutional neural network can only locate some most discriminative regions in the object. Therefore, the multi-magnification dilated convolutional neural network model provided in this embodiment of this application can locate the global object location maps in the raw image at different degrees of dispersion.

In the foregoing embodiment of this application, the full-image classification annotation may be performed on the raw image at different dilation magnifications by using the multi-magnification dilated convolutional neural network model, to obtain global object location maps at different degree of dispersion, and the full-image classification annotation may be performed on the raw image at a dilation magnification by using the multi-magnification dilated convolutional neural network model, to obtain a global object location map at a degree of dispersion. That is, the dilation magnification of the multi-magnification dilated convolutional neural network model is in a correspondence with the degree of dispersion of the global object location map.

The degree of dispersion is used for indicating a distribution, on a target object, of object regions located by the multi-magnification dilated convolutional neural network model. In the object regions located by the multi-magnification dilated convolutional neural network model, high response object regions corresponding to the full-image classification annotation in the raw image may be specifically obtained by using a class activation map (CAM). Different degrees of dispersion refer to distributions of the located high response object regions on a real object. If the high response object regions are more concentrated on a small part of the target object, a value of the degree of dispersion is lower, and if the high response object regions are distributed on the entire target object, the value of the degree of dispersion is higher. In this embodiment of this application, full-image classification annotations of different dilation magnifications may be performed on the raw image by using the multi-magnification dilated convolutional neural network model, to obtain global object location maps in the raw image at different degrees of dispersion. Therefore, the global object location maps not only can locate some most discriminative regions of the target object, but also can locate other regions that are less discriminative, to locate all regions of the target object.

In some embodiments of this application, step 102 of performing a full-image classification annotation on the raw image by using a multi-magnification dilated convolutional neural network model, to obtain global object location maps in the raw image at different degrees of dispersion includes:

extracting a feature map of the target object from the raw image by using the first N−1 convolutional layers in the multi-magnification dilated convolutional neural network model, the multi-magnification dilated convolutional neural network model including: N convolutional layers, where an $N^{th}$ convolutional layer is a multi-magnification dilated convolutional layer, and N is a positive integer;

performing dilated convolutional processing on the feature map of the target object at a plurality of dilation magnifications d separately by using the multi-magnification dilated convolutional layer, to obtain object regions at different degrees of dispersion, where d is a positive integer; and performing global average pooling processing on the object regions at different degrees of dispersion, to obtain the global object location maps in the raw image at different degrees of dispersion.

The multi-magnification dilated convolutional neural network model used in this embodiment of this application includes a total of N convolutional layers. The feature map of the target object may be extracted from the raw image by using the first N−1 convolutional layers, the $N^{th}$ convolutional layer is the last convolutional layer, and the $N^{th}$ convolutional layer is a multi-magnification dilated convolutional layer. That is, the $N^{th}$ convolutional layer uses a multi-magnification dilated convolution, and the quantity N of the convolutional layers of the multi-magnification dilated convolutional neural network model may be determined according to a specific scenario. In this embodiment of this application, location by using a dilated convolutional object may depart from the advantage of the most discriminative part, and the multi-magnification dilated convolutional neural network model is used. In the network model, a multi-magnification dilated convolutional layer is introduced behind the last layer of the conventional convolutional neural network model. The multi-magnification dilated convolutional layer uses dilated convolutions of a plurality of dilation magnifications (for example, $d=r_1, r_2 \ldots r_k$) to perform convolution operations, to learn the object regions at different degrees of dispersion, and then perform global average pooling (GAP) processing, to obtain global object location maps at different degrees of dispersion. The global object location maps include the entire region of the target object.

Further, in some embodiments of this application, the performing global average pooling processing on the object regions at different degrees of dispersion, to obtain global object location maps in the raw image at different degrees of dispersion includes:

obtaining a first object region in a case that the dilation magnification is 0, and a second object region in a case that the dilation magnification is greater than 0;

obtaining a first weight corresponding to the first object region, and a second weight corresponding to the second object region, where a value of the first weight is greater than a value of the second weight; and fusing the first object region and the second object region at different degrees of dispersion according to the first weight and the second weight, to obtain the global object location map.

The multi-magnification dilated convolutional layer is used to perform dilated convolution processing on the feature map of the target object at a plurality of dilation magnifications d separately. An object region obtained when the dilation magnification is 0 is referred to as a first object region, and an object region obtained when the dilation magnification is greater than 0 is referred to as a second object region. Finally, object regions with different weights are fused, and an object region whose magnification is 0 is set to be higher than an object region at another magnification in the fusion process because a wrong object region may be located through the dilated convolution. Only when the same region is located on at least two object regions, it can indicate that the region is a correct effective object region. Therefore, in this embodiment of this application, a high weight may be assigned to a convolutional object region without dilation outside a multi-magnification dilated convolutional object region, so that it can be avoided that a correct most discriminative object region located by the convolutional object region without dilation is filtered out by an average operation of the dilated convolutional object region. By means of the fusion manner, a highly accurate object location region can be obtained and used as supervision information for a high-quality image segmentation to train an image semantic segmentation network subsequently.

Next, the manner of fusing different object regions according to weights in this embodiment of this application is described by using an example. Further, the fusing the first object region and the second object regions at different degrees of dispersion according to the first weight and the second weight, to obtain the global object location map includes:

determining a first object region $H_0$ in a case that d is equal to 0, and a second object region $(H_1, H_2, \ldots, H_k)$ in a case that d is greater than 0 and less than or equal to k, where k is a maximum value of the dilation magnification;

fusing the first object region $H_0$ and the second object region $(H_1, H_2, \ldots, H_k)$ at different degrees of dispersion in the following manner, to obtain the global object location map H:

$$H = H_0 + \frac{1}{k}\sum_{i=1}^{k}H_i,$$

where the first weight is 1, the second weight is $$\frac{1}{k},$$

and $H_i$ represents an $i^{th}$ object region in the second object region $(H_1, H_2, \ldots, H_k)$.

The multi-magnification dilated convolutional neural network model may be used to obtain the object regions at different dilation magnifications, and the second object region includes the object region $(H_1, H_2, \ldots, H_k)$ that can be generated for a dilated convolution of each dilation magnification When d=0, the first object region $H_0$ corresponding to the convolution without dilation may be used. The final global object location map H is the fusion of all object regions in at different magnifications of dilated convolutions.

In the fusion process of the foregoing formula H, the first weight is 1, and the second weight is $$\frac{1}{k}.$$

In an actual application scenario, weights separately corresponding to the first object region and the second object region may be set according to the scenario.

In this embodiment of this application, the performing dilated convolutional processing on the feature map of the target object at a plurality of dilation magnifications d separately by using the multi-magnification dilated convolutional layer, to obtain object regions at different degrees of dispersion includes:

obtaining a pixel feature point whose coordinates are (x, y) on a $t^{th}$ feature map of the multi-magnification dilated convolutional layer, where t is a positive integer;

obtaining a weight $w_{t,d}^c$ of connecting the $t^{th}$ feature map to a $c^{th}$ class at a dilation magnification d, where c is a positive integer; and calculating an object region $H_d^c$ corresponding to the $c^{th}$ class at the dilation magnification d in the following manner:

$$H_d^c = \Sigma_t \Sigma_{x,y} w_{t,d}^c f_t(x,y).$$

At each dilation magnification, the multi-magnification dilated convolutional layer obtains high response object regions corresponding to the full-image classification annotation in the raw image by using the CAM. Assuming that $f_k(x, y)$ is values of the coordinates (x, y) on a $k^{th}$ feature map of the last convolutional layer, and $w_k^c$ is a weight of connecting the $k^{th}$ feature map to the $c^{th}$ class, the object region $H_d^c$ corresponding to the $c^{th}$ class may be calculated according to the foregoing formula.

103. Train an image semantic segmentation network model using the global object location maps as supervision information.

In this embodiment of this application, after the global object location maps in the raw image at different degrees of dispersion are obtained by using the multi-magnification dilated convolutional neural network model, and the located global object location maps are used as supervision information for segmentation, to train an image semantic segmentation network model to implement an image segmentation. For example, the image semantic segmentation network model provided in this embodiment of this application may be specifically a deep convolutional neural network model. The located global object location maps are used as the supervision information to train the deep convolutional neural network model to implement the image segmentation. In this embodiment of this application, in the process of training the image semantic segmentation network model, sizes of used convolutional kernels and pooling kernels may be selected according to specific scenarios, which are not limited herein. Because in this embodiment of this application, the global object location maps are used as the supervision information for the image semantic segmentation network model, and the global object location maps include a highly accurate object location region and can be used as supervision information for a high-quality image segmentation to train the image semantic segmentation network model. A semantic segmentation result may be used in search by image based on image content on a website, personalized recommendations based on image content analysis, and the like.

In some embodiments of this application, step 103 of using the global object location maps as supervision information for an image semantic segmentation network model, and training the image semantic segmentation network model by using the supervision information includes:

inputting the raw image into the image semantic segmentation network model, to obtain an image classification result by using the image semantic segmentation network model;

calculating a cross entropy loss function according to the image classification result and the global object location maps, to obtain a loss result; and back-propagating the loss result to all layers of the image semantic segmentation network model, to continue to train the image semantic segmentation network model.

The image semantic segmentation network model is used to obtain an image classification result, and across entropy loss function is calculated on the result when the supervision information of the full-image classification annotation is given. The cross entropy loss function may be specifically a sigmoid function. Then, the loss result is returned to all layers of the image semantic segmentation network model through back-propagation to train network parameters. After the image semantic segmentation network model is trained completely, all the layers of the image semantic segmentation network model may be used for performing image semantic outputting on an input image.

It can be known from the description for the embodiments of the application through the foregoing embodiments that, first, a raw image used for model training is obtained, then, a full-image classification annotation is performed on the raw image by using a multi-magnification dilated convolutional neural network model, to obtain global object location maps in the raw image at different degrees of dispersion, the degree of dispersion being used for indicating a distribution, on a target object, of object regions located by the multi-magnification dilated convolutional neural network model, and finally, the global object location maps are used as supervision information for an image semantic segmentation network model, and the image semantic segmentation network model is trained by using the supervision information. In this embodiment of this application, because the full-image classification annotation is performed on the raw image by using the multi-magnification dilated convolutional neural network model, global object location maps at different degrees of dispersion can be located from the raw image through a multi-magnification dilated convolution of the multi-magnification dilated convolutional neural network model. The global object location maps include all regions of the target object. Therefore, in this embodiment of this application, all object regions corresponding to the full-image classification annotation in the raw image are precisely located by the multi-magnification dilated convolutional neural network model, thereby improving the segmentation quality of an image semantic segmentation.

For better understanding and implementation of the foregoing solutions of the embodiments of this application, specific descriptions are provided below by using examples of corresponding application scenarios.

In this embodiment of this application, the raw image used for model training may have a plurality of sources. For example, images with annotations created by users may be automatically crawled on a website with massive user data, to train a weakly supervised image semantic segmentation network to implement the image semantic segmentation. A semantic segmentation result may be used in search by image based on image content on a website, personalized recommendations based on image content analysis, and the like.

This embodiment of this application includes using a multi-magnification dilated convolutional neural network model to achieve the full-image classification objective. The network model can overcome the defects that the convolutional neural network can only locate some most discriminative regions in the object. In this embodiment of this application, using the multi-magnification dilated convolutional neural network model not only can locate some most discriminative regions of the object, but also can locate other regions that are less discriminative, to locate all object regions. Then, all the located object regions are used as supervision information, to train an image semantic segmentation network model to implement an image segmentation.

Figure 2:
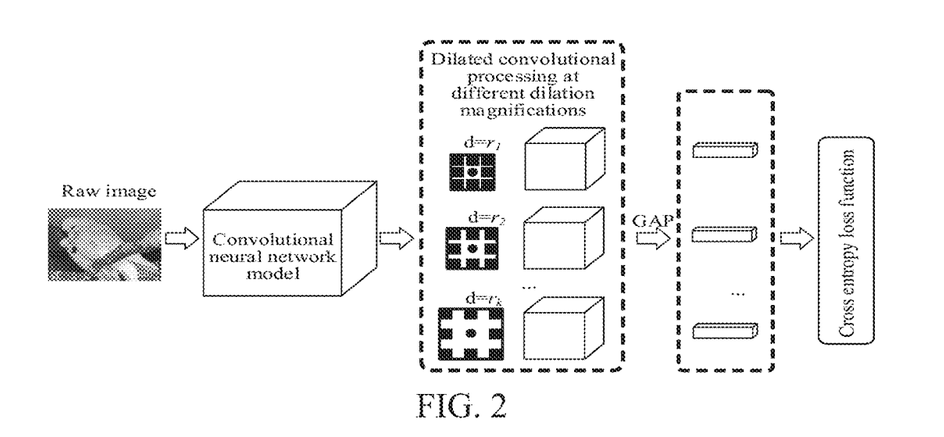
FIG. 2 is a schematic structural diagram of a multi-magnification dilated convolutional network model according to an embodiment of this application.

In this embodiment of this application, a multi-magnification dilated convolutional neural network may be used to locate all object regions, that is, generate global object location maps. FIG. 2 is a schematic structural diagram of a multi-magnification dilated convolutional network model according to an embodiment of this application. Location by using a dilated convolutional object may depart from the advantage of the most discriminative part. This embodiment of this application provides a multi-magnification dilated convolutional neural network model. In the network, a multi-magnification dilated convolutional layer is introduced behind the last layer of the convolutional neural network model. The multi-magnification dilated convolutional layer uses dilated convolutions of a plurality of dilation magnifications ($d=r_1, r_2 \ldots r_k$) to perform convolution operations, to learn object regions at different degrees of dispersion, and then perform global average pooling processing, to obtain global object features at different degrees of dispersion. Then, the features are fused to obtain a final image classification result, and a cross entropy loss function is calculated on the result when the supervision information of the full-image classification annotation is given. Then, the loss is returned to all layers of the network through back-propagation to train network parameters.

In some embodiments of this application, the multi-magnification dilated convolutional network model can generate an object location map ($H_1, H_2, \ldots, H_k$) shown in FIG. 2 for a dilated convolution of each dilation magnification. When d=0, an object location map $H_0$ corresponding to a convolution without a dilation magnification may be generated. The final global object location map H is the fusion of all location maps at different magnifications of dilated convolutions:

$$H = H_0 + \frac{1}{k}\sum_{i=1}^{k} H_i.$$

In this embodiment of this application, in the foregoing fusion process, a ratio of a location map of a convolution without a dilation magnification (d=0) is set to be higher than that of a location map at another magnification, because a wrong object region may be located through the dilated convolution. Only when the same region is located on at least two object location maps, it can indicate that the region is a correct effective object region. Therefore, a high weight may be assigned to a convolutional location map without a dilation magnification outside a multi-magnification dilated convolutional location map, so that it can be avoided that a correct most discriminative part located by a convolution without a dilation magnification is filtered out by an average operation of a convolutional location map with a dilation magnification. By using the fusion manner, a highly accurate object location region can be obtained and used as supervision information for a high-quality image segmentation to train an image semantic segmentation network subsequently.

Figure 3:
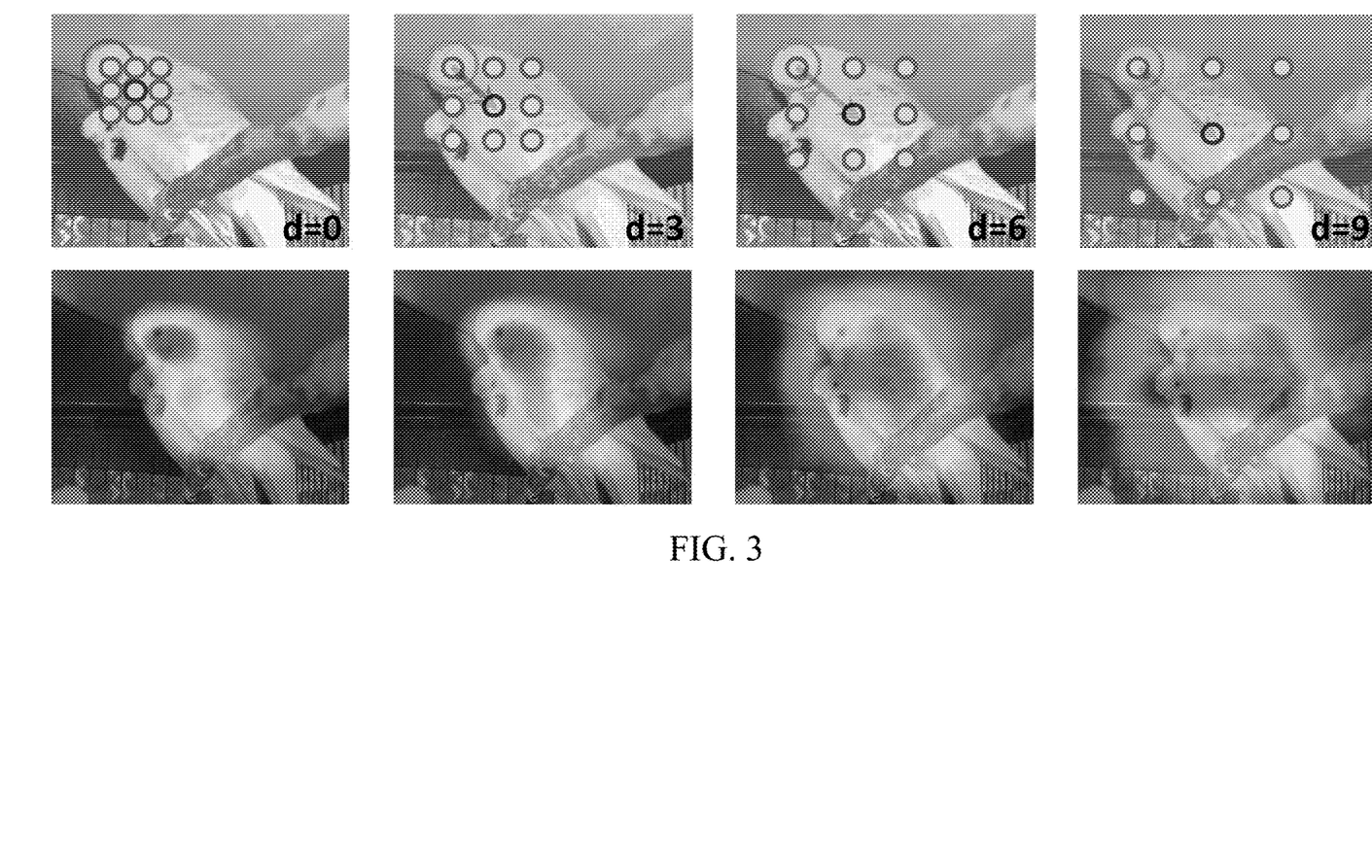
FIG. 3 is a schematic diagram of a process of obtaining object regions in an image on a deep convolutional neural network model at a dilation magnification according to an embodiment of this application.

FIG. 3 is a schematic diagram of a process of obtaining an object region in an image on a deep convolutional neural network model at a dilation magnification according to an embodiment of this application. The deep convolutional neural network model in this embodiment of this application obtains high response object regions corresponding to the full-image classification annotation in the raw image by using the CAM. Assuming that $f_k(x, y)$ is values of the coordinates (x, y) on a $k^{th}$ feature map of the last convolutional layer, and $w_k^c$ is a weight of connecting the $k^{th}$ feature map to a $c^{th}$ class, corresponding to the $c^{th}$ class of the CAM, the following may be acquired:

$$s_c = \Sigma_k w_k^c \Sigma_{x,y} f_k(x,y) = \Sigma_k \Sigma_{x,y} w_k^c f_k(x,y).$$

Figure 4:
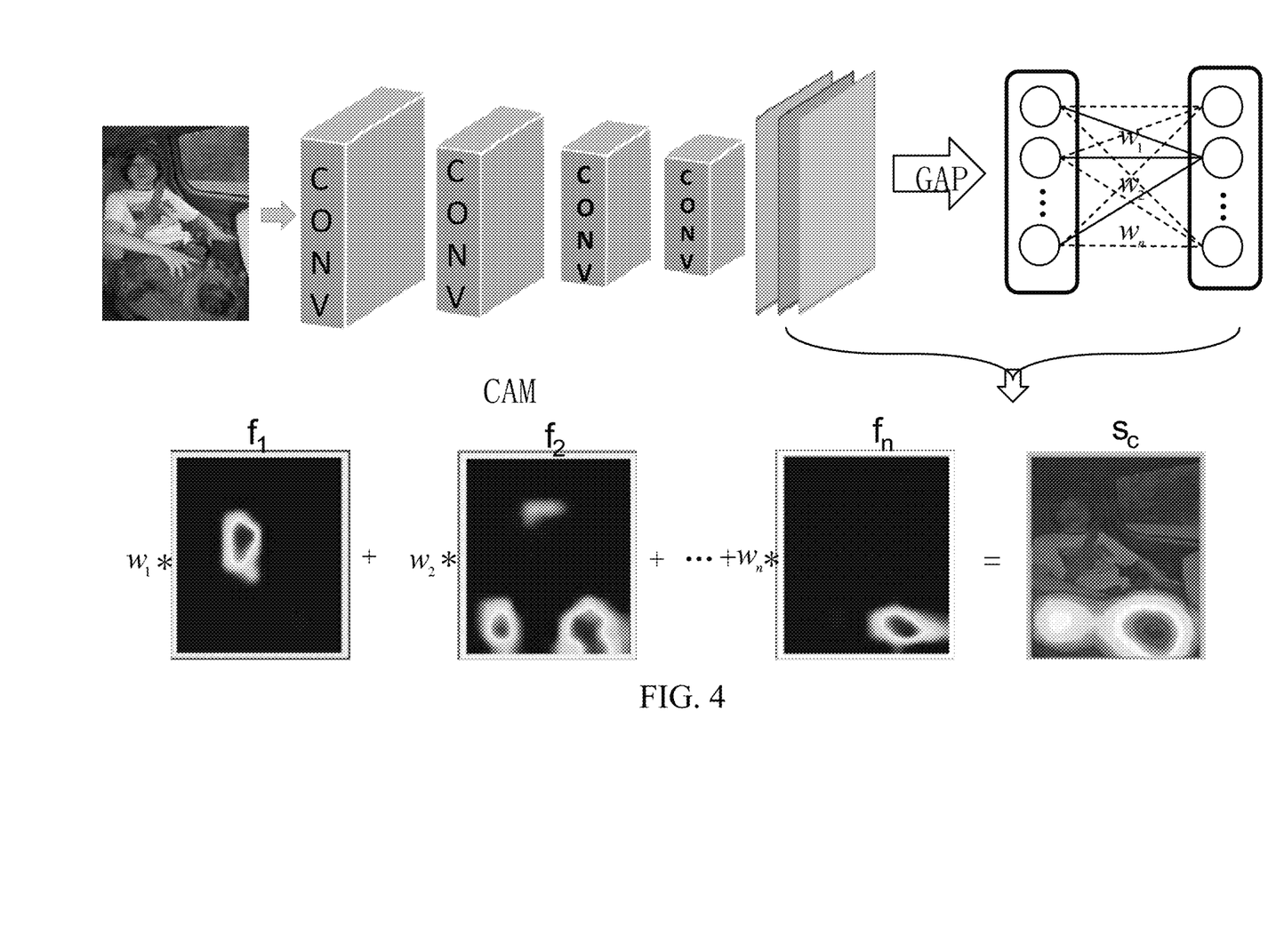
FIG. 4 is a schematic diagram of different dilation magnifications of dilated convolutions and corresponding object regions located in an image according to an embodiment of this application.

In this embodiment of this application, a discrimination between a convolution with a dilation magnification and a convolution without a dilation magnification is shown in FIG. 4, which is a schematic diagram of different dilation magnifications of dilated convolutions and corresponding object regions located in an image according to an embodiment of this application. The convolution without a dilation magnification may be regarded as a dilated convolution with d=0. It can be seen from FIG. 4 that, because of a smaller receptive field of a network, the object region located by the convolution without a dilation magnification is usually concentrated on a most discriminative part, and because of a larger receptive field, the object region located by the convolution with a dilation magnification is more disperse, and a greater d indicates a more disperse region. d=0 is a dilation magnification of a dilated convolution, and it may be regarded that there is no dilation magnification, that is, a conventional convolutional neural network. If d>0, there is a dilation magnification, that is, a dilated convolutional neural network.

Figure 5:
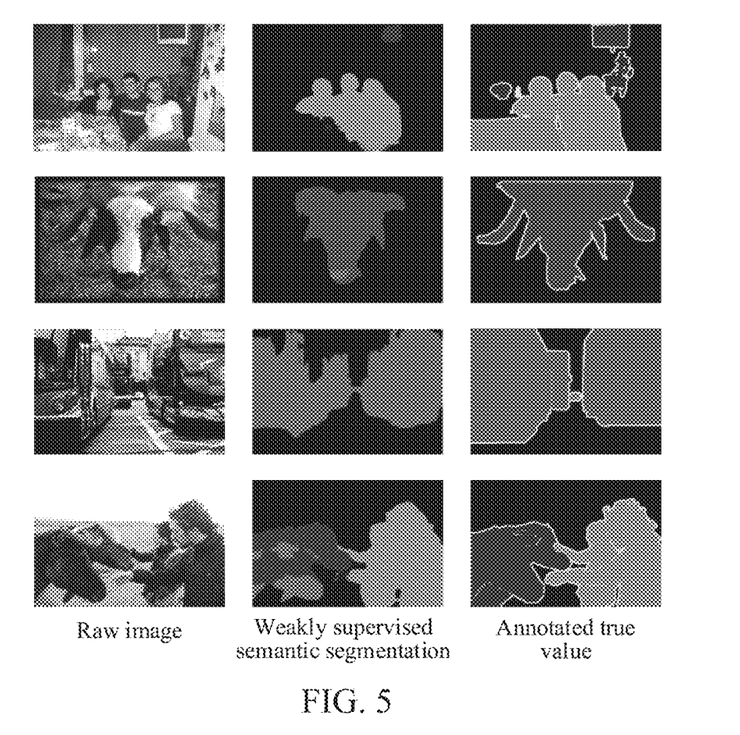
FIG. 5 is a schematic diagram of a network segmentation result of weakly supervised image classification annotation training according to an embodiment of this application.

FIG. 5 is a schematic diagram of a network segmentation result of weakly supervised image classification annotation training according to an embodiment of this application. In this embodiment of this application, image data with annotations created by massive users on the Internet is used to train a fine image semantic segmentation network, massive image data that cannot be used previously is effectively used, and costs of manual annotation for the image segmentation are correspondingly reduced, providing potential economic values for the image semantic segmentation and applications thereof. The image segmentation effect obtained by using the technology is shown in FIG. 5, and it can be seen that the segmentation quality close to a fully supervised annotation can be obtained only based on a weakly supervised annotation.

This embodiment of this application is not only suitable for the multi-magnification dilated convolutional network described above, but also suitable for other multi-scale convolutional networks, including convolutions with a plurality of sizes of convolutional kernels, and pooling with a plurality of sizes of pooling kernels.

For simple descriptions, the foregoing method embodiments are stated as a series of action combinations. However, it is to be appreciated by persons skilled in the art that this application is not limited to the sequence of the described actions because according to this application, some steps may use another sequence or may be simultaneously performed. In addition, it is to be appreciated by persons skilled in the art that all the embodiments described in this specification are exemplary embodiments, and the related actions and modules are not necessarily required in this application.

To better implement the foregoing solutions of the embodiments of this application, related apparatuses used to implement the foregoing solutions are further provided below.

Referring to FIG. 6-a, a server 600 provided in an embodiment of this application may include: an image obtaining module 601, a global object location module 602, and a model training module 603.

Figure 6A:
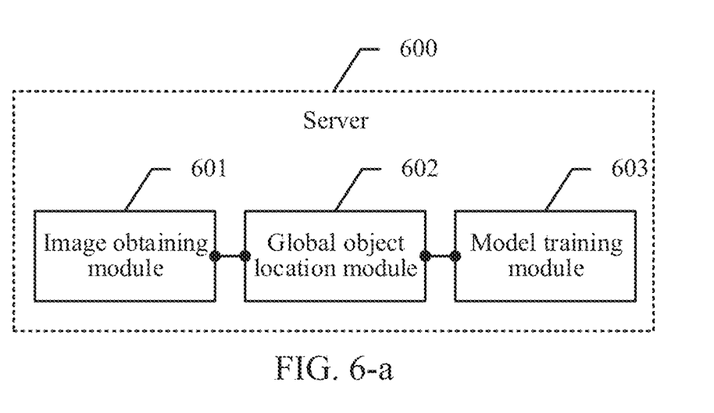

The image obtaining module 601 is configured to obtain a raw image used for model training.

The global object location module 602 is configured to perform a full-image classification annotation on the raw image by applying a multi-magnification dilated convolutional neural network model to the raw image, and obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion.

The model training module 603 is configured to train an image semantic segmentation network model using the global object location maps as supervision information.

Figure 6B:
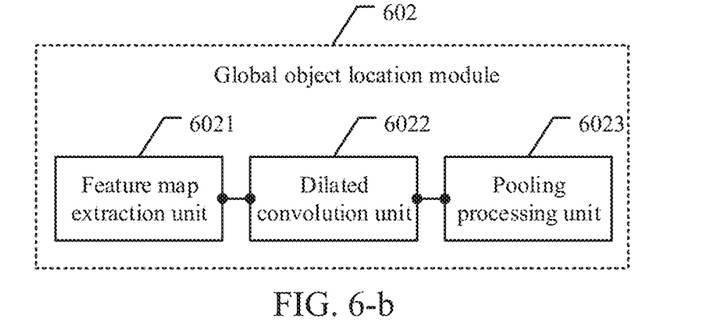

In some embodiments of this application, referring to FIG. 6-b, the global object location module 602 includes:

a feature map extraction unit 6021, configured to extract a feature map of the target object from the raw image by using the first N−1 convolutional layers in the multi-magnification dilated convolutional neural network model, the multi-magnification dilated convolutional neural network model including: N convolutional layers, where an $N^{th}$ convolutional layer is a multi-magnification dilated convolutional layer, and N is a positive integer;

a dilated convolution unit 6022, configured to perform dilated convolution processing on the feature map of the target object at a plurality of dilation magnifications d separately by using the multi-magnification dilated convolutional layer, to obtain object regions at different degrees of dispersion, where d is a positive integer; and a pooling processing unit 6023, configured to perform global average pooling processing on the object regions at different degrees of dispersion, to obtain the global object location maps in the raw image at different degrees of dispersion.

Figure 6C:
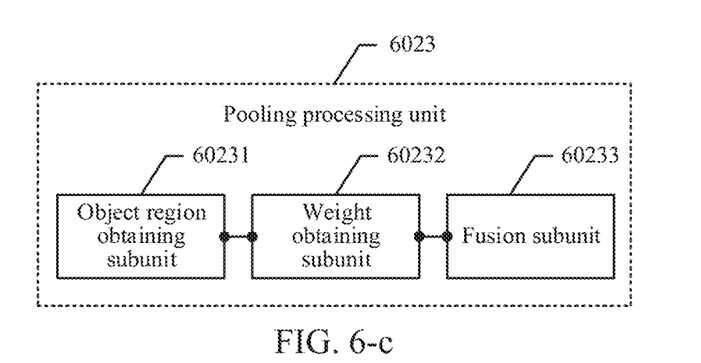

In some embodiments of this application, referring to FIG. 6-c, the pooling processing unit 6023 includes:

an object region obtaining subunit 60231, configured to obtain a first object region in a case that the dilation magnification is 0, and a second object region in a case that the dilation magnification is greater than 0;

a weight obtaining subunit 60232, configured to obtain a first weight corresponding to the first object region, and a second weight corresponding to the second object region, where a value of the first weight is greater than a value of the second weight; and a fusion subunit 60233, configured to fuse the first object region and the second object region at different degrees of dispersion according to the first weight and the second weight, to obtain the global object location map.

In some embodiments of this application, the fusion subunit 60233 is specifically configured to determine a first object region $H_0$ in a case that d is equal to 0, and a second object region $(H_1, H_2, \ldots, H_k)$ in a case that d is greater than 0 and less than or equal to k, where k is a maximum value of the dilation magnification; and fuse the first object region $H_0$ and the second object region ($H_1, H_2, \ldots, H_k$) at different degrees of dispersion in the following manner, to obtain the global object location map H:

$$H = H_0 + \frac{1}{k}\sum_{i=1}^{k} H_i,$$

where the first weight is 1, the second weight is $$\frac{1}{k},$$

and $H_i$ represents an $i^{th}$ object region in the second object region ($H_1, H_2, \ldots, H_k$).

Figure 6D:
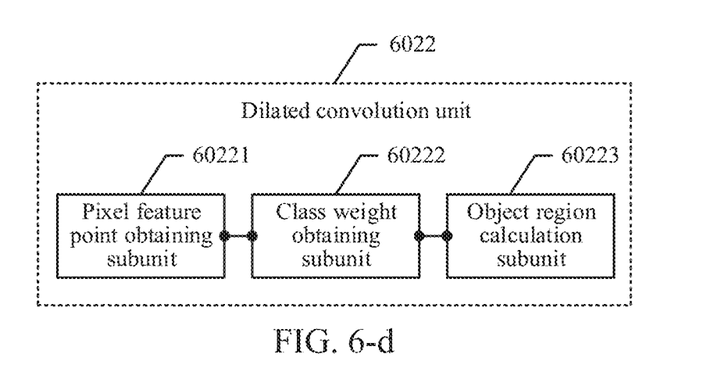

In some embodiments of this application, referring to FIG. 6-d, the dilated convolution unit 6022 includes:

a pixel feature point obtaining subunit 60221, configured to obtain a pixel feature point $f_t(x, y)$ whose coordinates are (x, y) on a $t^{th}$ feature map of the multi-magnification dilated convolutional layer, where t is a positive integer;

a class weight obtaining subunit 60222, configured to obtain a weight $w_{t,d}^c$ of connecting the $t^{th}$ feature map to a $c^{th}$ class at the dilation magnification d, where c is a positive integer; and an object region calculation subunit 60223, configured to calculate an object region $H_d^c$ corresponding to the $c^{th}$ class at the dilation magnification d in the following manner:

$$H_d^c = \Sigma_t \Sigma_{x,y} w_{t,d}^c f_t(x,y).$$

Figure 6E:
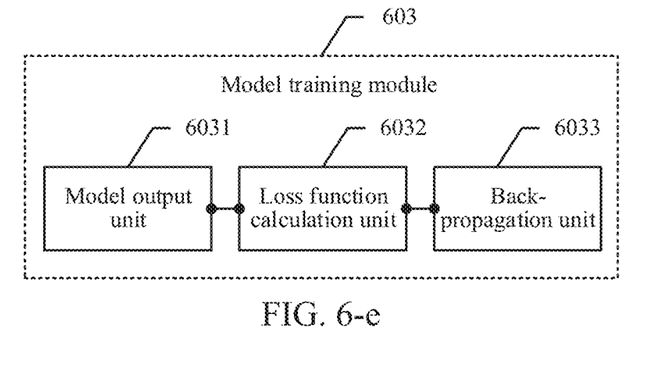

In some embodiments of this application, referring to FIG. 6-e, the model training module 603 includes:

a model output unit 6031, configured to input the raw image into the image semantic segmentation network model, and obtain an image classification result by using the image semantic segmentation network model;

a loss function calculation unit 6032, configured to calculate a cross entropy loss function according to the image classification result and the global object location maps, to obtain a loss result; and a back-propagation unit 6033, configured to back-propagate the loss result to all layers of the image semantic segmentation network model, to continue to train the image semantic segmentation network model.

In some embodiments of this application, the image semantic segmentation network model is specifically a deep convolutional neural network model.

It can be known from the description for the embodiments of the application description that, first, a raw image used for model training is obtained, then, a full-image classification annotation is performed on the raw image by using a multi-magnification dilated convolutional neural network model, to obtain global object location maps in the raw image at different degrees of dispersion, the degree of dispersion being used for indicating a distribution, on a target object, of object regions located by the multi-magnification dilated convolutional neural network model, and finally, the global object location maps are used as supervision information for an image semantic segmentation network model, and the image semantic segmentation network model is trained by using the supervision information. In this embodiment of this application, because the full-image classification annotation is performed on the raw image by using the multi-magnification dilated convolutional neural network model, global object location maps at different degrees of dispersion can be located from the raw image through a multi-magnification dilated convolution of the multi-magnification dilated convolutional neural network model. The global object location maps includes all regions of the target object. Therefore, in this embodiment of this application, all object regions corresponding to the full-image classification annotation in the raw image are precisely located by the multi-magnification dilated convolutional neural network model, thereby improving the segmentation quality of an image semantic segmentation.

Figure 7:
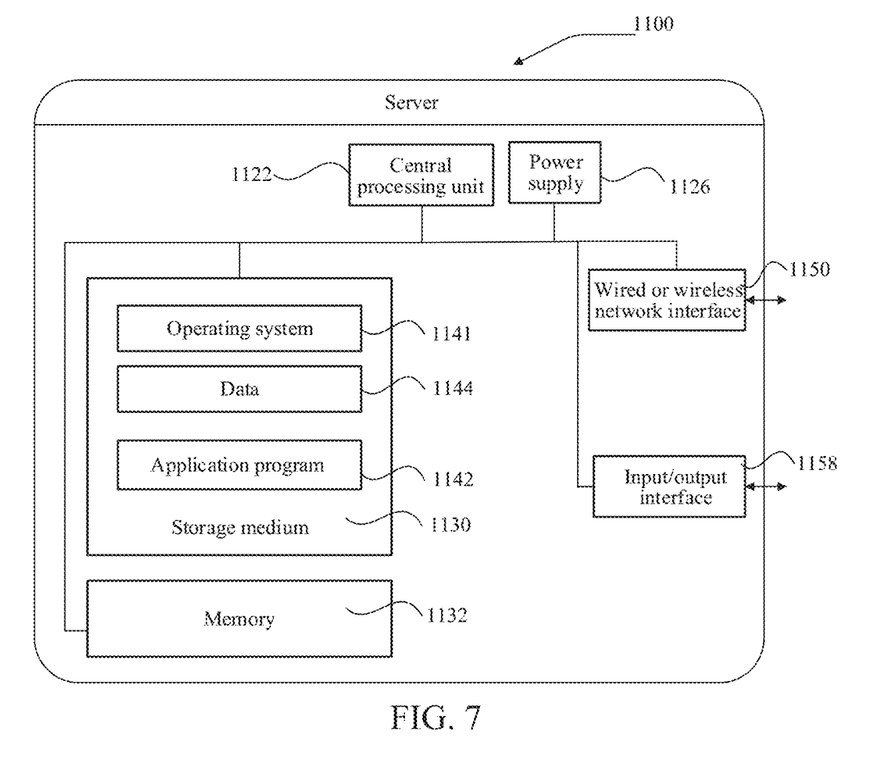
FIG. 7 is a schematic diagram of a composition structure of a server to which a training method for an image semantic segmentation model is applied according to an embodiment of this application.

FIG. 7 is a schematic structural diagram of a server according to an embodiment of this application. The server 1100 may vary greatly due to different configurations or performance, and may include one or more central processing units (CPUs) 1122 (for example, one or more processors) and a memory 1132, and one or more storage media 1130 (for example, one or more mass storage devices) that store an application program 1142 or data 1144. The memory 1132 and the storage medium 1130 may be transient storages or persistent storages. The program stored in the storage medium 1130 may include one or more modules (which is not marked in the figure), and each module may include a series of instruction and operations to the server. Still further, the CPU 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more operating systems 1141, for example, Windows Server™, Mac OS X™, Unix™, Linux™, and FreeBSD™.

The steps of the training method for an image semantic segmentation model performed by the server in the foregoing embodiments may be based on the server structure shown in FIG. 7.

In addition, an embodiment of this application further provides a storage medium. The storage medium is used for storing program code, and the program code is used for performing the method provided in the foregoing embodiments.

An embodiment of this application further provides a computer program product including an instruction. The instruction, when run on a server, causes the server to perform the method in the foregoing embodiments.

In addition, the described apparatus embodiment is merely exemplary. The units described as separate parts may or may not be physically separate, and parts displayed as units may or may not be physical units, may be located in one position, or may be distributed on a plurality of network units. Some or all modules thereof may be selected based on an actual requirement, to implement an objective of the solution in this embodiment. In addition, in the accompanying drawings of the apparatus embodiments provided in this application, connection relationships between modules indicate that the modules have communication connections with each other, which may be specifically implemented as one or more communications buses or signal cables. Persons of ordinary skill in the art may understand and implement the objective without creative efforts.

Based on the descriptions of the foregoing implementations, persons skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve the same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the existing technology may be implemented in a form of a software product. The computer software product is stored in a readable storage medium, such as a floppy disk, a USB flash drive, a removable hard disk, a read-only memory (ROM), a random access memory (RAM), a magnetic disk, or an optical disc of a computer, and includes several instructions for instructing a computer device (which may be a personal computer, a server, a network device, and the like) to perform the methods described in the embodiments of this application.

In conclusion, the foregoing embodiments are merely intended for describing the technical solutions of this application, but not for limiting this application. Although this application is described in detail with reference to the foregoing embodiments, it is to be understood by persons of ordinary skill in the art that they may still make modifications to the technical solutions described in the foregoing embodiments or make equivalent replacements to some technical features thereof, without departing from the spirit and scope of the technical solutions of the embodiments of this application.

What is claimed is:

1. A method for training an image semantic segmentation model, applied to a server, the method comprising:
   obtaining a raw image used for model training;
   performing a full-image classification annotation on the raw image at different dilation magnifications by:
      applying a multi-magnification dilated convolutional neural network model to the raw image, and
      obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion; and
   training an image semantic segmentation network model using the global object location maps as supervision information, further including:
      inputting the raw image into the image semantic segmentation network model, to obtain an image classification result by using the image semantic segmentation network model;
      calculating a cross entropy loss function according to the image classification result and the global object location maps, to obtain a loss result; and
      back-propagating the loss result to all layers of the image semantic segmentation network model, to update the image semantic segmentation network model.

2. The method according to claim 1, wherein the performing a full-image classification annotation on the raw image at different dilation magnifications further comprises:
   extracting a feature map of the target object from the raw image by using a first N−1 convolutional layers in the multi-magnification dilated convolutional neural network model, the multi-magnification dilated convolutional neural network model comprising: N convolutional layers, wherein an Nth convolutional layer is a multi-magnification dilated convolutional layer, and N is a positive integer;
   performing dilated convolution on the feature map of the target object at a plurality of dilation magnifications d separately by using the multi-magnification dilated convolutional layer, to obtain the object regions at different degrees of dispersion, wherein d is a positive integer; and
   performing global average pooling on the object regions at different degrees of dispersion, to obtain the global object location maps in the raw image at different degrees of dispersion.

3. The method according to claim 2, wherein the performing global average pooling on the object regions at different degrees of dispersion, to obtain the global object location maps in the raw image at different degrees of dispersion comprises:
   obtaining a first object region in a case that the dilation magnification is 0, and a second object region in a case that the dilation magnification is greater than 0;
   obtaining a first weight corresponding to the first object region, and a second weight corresponding to the second object region, wherein a value of the first weight is greater than a value of the second weight; and
   fusing the first object region and the second object region at different degrees of dispersion according to the first weight and the second weight, to obtain the global object location maps.

4. The method according to claim 3, wherein the fusing the first object region and the second object region at different degrees of dispersion according to the first weight and the second weight, to obtain the global object location maps comprises:
   determining a first object region $H_0$ in a case that d is equal to 0, and a second object region $(H_1, H_2, \ldots, H_k)$ in a case that d is greater than 0 and less than or equal to k, wherein k is a maximum value of the dilation magnification; and
   fusing the first object region $H_0$ and the second object region $(H_1, H_2, \ldots, H_k)$, at different degrees of dispersion in the following manner, to obtain the global object location map H:

$$H = H_0 + \frac{1}{k}\sum_{i=1}^{k} H_i,$$

wherein
the first weight is 1, the second weight is $$\frac{1}{k},$$

and $H_i$ represents an ith object region in the second object region $(H_1, H_2, \ldots, H_k)$.

5. The method according to claim 2, wherein the performing dilated convolution on the feature map of the target object at a plurality of dilation magnifications d separately by using the multi-magnification dilated convolutional layer, to obtain object regions at different degrees of dispersion comprises:
 obtaining a pixel feature point $f_t(x, y)$ whose coordinates are (x, y) on a t-th feature map of the multi-magnification dilated convolutional layer, wherein t is a positive integer;
 obtaining a weight $w_{t,d}^c$ of connecting the t-th feature map to a c-th class at the dilation magnification d, wherein c is a positive integer; and
 calculating an object region $H_d^c$ corresponding to the c-th class at the dilation magnification d in the following manner:

$$H_d^c = \Sigma_t \Sigma_{x,y} w_{t,d}^c f_t(x,y).$$

6. The method according to claim 1, wherein the image semantic segmentation network model comprises a deep convolutional neural network model.

7. A server, comprising a processor, memory and a plurality of programs stored in the memory, wherein the plurality of programs, when executed by the processor, cause the server to perform a plurality of operations including:
 obtaining a raw image used for model training;
 performing a full-image classification annotation on the raw image at different dilation magnifications by:
  applying a multi-magnification dilated convolutional neural network model to the raw image, and
  obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion; and
 training an image semantic segmentation network model using the global object location maps as supervision information, further including:
  inputting the raw image into the image semantic segmentation network model, to obtain an image classification result by using the image semantic segmentation network model;
  calculating a cross entropy loss function according to the image classification result and the global object location maps, to obtain a loss result; and
  back-propagating the loss result to all layers of the image semantic segmentation network model, to update the image semantic segmentation network model.

8. The server according to claim 7, wherein the performing a full-image classification annotation on the raw image at different dilation magnifications further comprises:
 extracting a feature map of the target object from the raw image by using a first N−1 convolutional layers in the multi-magnification dilated convolutional neural network model, the multi-magnification dilated convolutional neural network model comprising: N convolutional layers, wherein an Nth convolutional layer is a multi-magnification dilated convolutional layer, and N is a positive integer;
 performing dilated convolution on the feature map of the target object at a plurality of dilation magnifications d separately by using the multi-magnification dilated convolutional layer, to obtain the object regions at different degrees of dispersion, wherein d is a positive integer; and
 performing global average pooling on the object regions at different degrees of dispersion, to obtain the global object location maps in the raw image at different degrees of dispersion.

9. The server according to claim 8, wherein the performing global average pooling on the object regions at different degrees of dispersion, to obtain the global object location maps in the raw image at different degrees of dispersion comprises:
 obtaining a first object region in a case that the dilation magnification is 0, and a second object region in a case that the dilation magnification is greater than 0;
 obtaining a first weight corresponding to the first object region, and a second weight corresponding to the second object region, wherein a value of the first weight is greater than a value of the second weight; and
 fusing the first object region and the second object region at different degrees of dispersion according to the first weight and the second weight, to obtain the global object location maps.

10. The server according to claim 9, wherein the fusing the first object region and the second object region at different degrees of dispersion according to the first weight and the second weight, to obtain the global object location maps comprises:
 determining a first object region $H_0$ in a case that d is equal to 0, and a second object region ($H_1, H_2, \ldots, H_k$) in a case that d is greater than 0 and less than or equal to k, wherein k is a maximum value of the dilation magnification; and
 fusing the first object region $H_0$ and the second object region ($H_1, H_2, \ldots, H_k$), at different degrees of dispersion in the following manner, to obtain the global object location map H:

$$H = H_0 + \frac{1}{k}\sum_{i=1}^{k} H_i,$$

wherein
 the first weight is 1, the second weight is $$\frac{1}{k},$$

and $H_i$ represents an ith object region in the second object region ($H_1, H_2, \ldots, H_k$).

11. The server according to claim 8, wherein the performing dilated convolution on the feature map of the target object at a plurality of dilation magnifications d separately by using the multi-magnification dilated convolutional layer, to obtain object regions at different degrees of dispersion comprises:
 obtaining a pixel feature point $f_t(x, y)$ whose coordinates are (x, y) on a t-th feature map of the multi-magnification dilated convolutional layer, wherein t is a positive integer;
 obtaining a weight $w_{t,d}^c$ of connecting the t-th feature map to a c-th class at the dilation magnification d, wherein c is a positive integer; and calculating an object region $H_d^c$ corresponding to the c-th class at the dilation magnification d in the following manner:

$$H_d^c = \Sigma_t \Sigma_{x,y} w_{t,d}^c f_t(x,y).$$

12. The server according to claim 7, wherein the image semantic segmentation network model comprises a deep convolutional neural network model.

13. A non-transitory computer-readable storage medium storing instructions, the instructions, when executed by a processor of a server, cause the server to perform a plurality of operations including:
   obtaining a raw image used for model training;
   performing a full-image classification annotation on the raw image at different dilation magnifications by:
      applying a multi-magnification dilated convolutional neural network model to the raw image, and
      obtaining global object location maps in the raw image at different degrees of dispersion corresponding to the different dilation magnifications, wherein a degree of dispersion is used for indicating a distribution of a target object on an object region positioned by the multi-magnification dilated convolutional neural network model at a dilation magnification corresponding to the degree of dispersion; and
   training an image semantic segmentation network model using the global object location maps as supervision information, further including:
      inputting the raw image into the image semantic segmentation network model, to obtain an image classification result by using the image semantic segmentation network model;
      calculating a cross entropy loss function according to the image classification result and the global object location maps, to obtain a loss result; and
      back-propagating the loss result to all layers of the image semantic segmentation network model, to update the image semantic segmentation network model.

14. The non-transitory computer-readable storage medium according to claim 13, wherein the performing a full-image classification annotation on the raw image at different dilation magnifications further comprises:
   extracting a feature map of the target object from the raw image by using a first N−1 convolutional layers in the multi-magnification dilated convolutional neural network model, the multi-magnification dilated convolutional neural network model comprising: N convolutional layers, wherein an Nth convolutional layer is a multi-magnification dilated convolutional layer, and N is a positive integer;
   performing dilated convolution on the feature map of the target object at a plurality of dilation magnifications d separately by using the multi-magnification dilated convolutional layer, to obtain the object regions at different degrees of dispersion, wherein d is a positive integer; and
   performing global average pooling on the object regions at different degrees of dispersion, to obtain the global object location maps in the raw image at different degrees of dispersion.

15. The non-transitory computer-readable storage medium according to claim 14, wherein the performing global average pooling on the object regions at different degrees of dispersion, to obtain the global object location maps in the raw image at different degrees of dispersion comprises:
   obtaining a first object region in a case that the dilation magnification is 0, and a second object region in a case that the dilation magnification is greater than 0;
   obtaining a first weight corresponding to the first object region, and a second weight corresponding to the second object region, wherein a value of the first weight is greater than a value of the second weight; and
   fusing the first object region and the second object region at different degrees of dispersion according to the first weight and the second weight, to obtain the global object location maps.

16. The non-transitory computer-readable storage medium according to claim 15, wherein the fusing the first object region and the second object region at different degrees of dispersion according to the first weight and the second weight, to obtain the global object location maps comprises:
   determining a first object region $H_0$ in a case that d is equal to 0, and a second object region $(H_1, H_2, \ldots, H_k)$ in a case that d is greater than 0 and less than or equal to k, wherein k is a maximum value of the dilation magnification; and
   fusing the first object region $H_0$ and the second object region $(H_1, H_2, \ldots, H_k)$ at different degrees of dispersion in the following manner, to obtain the global object location map H:

$$H = H_0 + \frac{1}{k}\sum_{i=1}^{k} H_i,$$

wherein
   the first weight is 1, the second weight is $$\frac{1}{k},$$

and $H_i$ represents an ith object region in the second object region $(H_1, H_2, \ldots, H_k)$.

17. The non-transitory computer-readable storage medium according to claim 14, wherein the performing dilated convolution on the feature map of the target object at a plurality of dilation magnifications d separately by using the multi-magnification dilated convolutional layer, to obtain object regions at different degrees of dispersion comprises:
   obtaining a pixel feature point $f_t(x, y)$ whose coordinates are (x, y) on a t-th feature map of the multi-magnification dilated convolutional layer, wherein t is a positive integer;
   obtaining a weight $w_{t,d}^c$ of connecting the t-th feature map to a c-th class at the dilation magnification d, wherein c is a positive integer; and
   calculating an object region $H_d^c$ corresponding to the c-th class at the dilation magnification d in the following manner:

$$H_d^c = \Sigma_t \Sigma_{x,y} w_{t,d}^c f_t(x,y).$$

* * * * *